US011717894B2

(12) United States Patent
Todkar

(10) Patent No.: US 11,717,894 B2
(45) Date of Patent: Aug. 8, 2023

(54) INDEXABLE DRILL INSERT

(71) Applicant: KENNAMETAL INDIA LIMITED, Bangalore (IN)

(72) Inventor: Mahesh Todkar, Bangalore (IN)

(73) Assignee: KENNAMETAL INDIA LTD., Bangalore (IN)

(*) Notice: Subject to any disclaimer, the term of this patent is extended or adjusted under 35 U.S.C. 154(b) by 105 days.

(21) Appl. No.: 16/992,833

(22) Filed: Aug. 13, 2020

(65) Prior Publication Data

US 2021/0046555 A1 Feb. 18, 2021

(30) Foreign Application Priority Data

Aug. 14, 2019 (IN) .............................. 201941032861

(51) Int. Cl.
*B23B 27/16* (2006.01)
*B23B 51/00* (2006.01)
(52) U.S. Cl.
CPC .......... *B23B 27/1611* (2013.01); *B23B 51/00* (2013.01)
(58) Field of Classification Search
CPC . B23B 51/00; B23B 51/0006; B23B 51/0007; B23B 51/00011; B23B 2200/286; B23B 2200/3672; B23B 2200/3645; B23B 2200/081; B23B 27/141; B23B 27/143; B23B 27/1611; B23B 27/1607; B23B 27/1603; B23B 2200/321; B23B 2200/082; B23B 2200/326; B23C 2200/326; B23C 2200/323; B23C 2200/081; B23C 2200/082; B23C 2200/32; B23C 5/205
See application file for complete search history.

(56) References Cited

U.S. PATENT DOCUMENTS

| 4,475,851 A | 10/1984 | Hale |
| 4,648,760 A | 3/1987 | Karlsson et al. |
| 4,990,036 A | 2/1991 | Eklund et al. |
| 5,221,164 A | 6/1993 | Allaire |
| 5,503,509 A | 4/1996 | Von |

(Continued)

FOREIGN PATENT DOCUMENTS

| JP | 60109806 | 7/1985 |
| JP | 2008207283 A | 9/2008 |

(Continued)

OTHER PUBLICATIONS

Jul. 23, 2021 EPO Notification R.70b(1) EP App. No. 3778083.

(Continued)

*Primary Examiner* — Alan Snyder
(74) *Attorney, Agent, or Firm* — Christopher J. Owens

(57) ABSTRACT

An indexable drill insert (10) includes a top surface (12), a bottom surface (14), and a plurality of side surfaces (16) adjoining the top surface (12) and the bottom surface (14). A plurality of cutting edges (20) is formed by an intersection of a respective side surface (16) with the top surface (12). One aspect of the invention is that the top surface (12) includes a protruding portion (50) having a backwall (50*a*) and a segmented portion (52) extending radially outwardly with respect to the protruding portion (50) for effective chip breaking. Another aspect of the invention is that a rake surface (48) has a positive rake angle (RA) that varies along a first cutting edge section (22) of the cutting edge (20) to lower cutting force.

19 Claims, 8 Drawing Sheets

(56) References Cited

U.S. PATENT DOCUMENTS

| | | | |
|---|---|---|---|
| 5,597,271 A | 1/1997 | Men et al. | |
| 5,630,681 A | 5/1997 | Paya | |
| 5,634,747 A | 6/1997 | Tukala et al. | |
| 5,807,031 A | 9/1998 | Arai et al. | |
| 5,890,853 A | 4/1999 | Hiranaka | |
| 5,954,459 A | 9/1999 | Noguchi | |
| 5,971,672 A | 10/1999 | Hansson | |
| 5,971,676 A | 10/1999 | Kojima | |
| 6,039,515 A | 3/2000 | Lamberg | |
| 6,186,705 B1 | 2/2001 | Kumar et al. | |
| 6,257,807 B1 | 7/2001 | Heinloth | |
| 6,267,541 B1 * | 7/2001 | Isakov | B23B 27/143 |
| | | | 407/115 |
| 6,543,970 B1 | 4/2003 | Qvarth et al. | |
| 6,948,891 B2 | 9/2005 | Roman | |
| 7,201,542 B2 | 4/2007 | Fritsch et al. | |
| 8,651,778 B2 | 2/2014 | Okumura | |
| 8,926,234 B2 | 1/2015 | Engstrom et al. | |
| 9,168,589 B2 | 10/2015 | Ramesh | |
| 9,272,335 B2 | 3/2016 | Ramesh | |
| 9,782,844 B2 | 10/2017 | Ogata | |
| 10,207,339 B2 | 2/2019 | Park et al. | |
| 2001/0033779 A1 | 10/2001 | Wiman et al. | |
| 2002/0061235 A1 | 5/2002 | Maier | |
| 2003/0161696 A1 | 8/2003 | Fritsch et al. | |
| 2003/0180103 A1 | 9/2003 | Nagaya | |
| 2003/0223832 A1 | 12/2003 | Roman et al. | |
| 2003/0223833 A1 | 12/2003 | Roman | |
| 2005/0111928 A1 | 5/2005 | Stanarius et al. | |
| 2005/0260049 A1 | 11/2005 | Kruszynski | |
| 2006/0260439 A1 | 11/2006 | Tubinger et al. | |
| 2007/0201962 A1 | 8/2007 | Limell et al. | |
| 2008/0075547 A1 | 3/2008 | Wolf | |
| 2008/0170921 A1 | 7/2008 | Sjoo | |
| 2008/0181737 A1 | 7/2008 | Limell et al. | |
| 2008/0219791 A1 | 9/2008 | Nasu et al. | |
| 2008/0304925 A1 | 12/2008 | Meyer et al. | |
| 2009/0071723 A1 | 3/2009 | Mergenthaler et al. | |
| 2009/0238649 A1 | 9/2009 | Kruszynski et al. | |
| 2009/0245949 A1 | 10/2009 | Takahashi | |
| 2010/0034606 A1 | 2/2010 | Nasu et al. | |
| 2010/0034607 A1 | 2/2010 | Meyer et al. | |
| 2010/0061821 A1 | 3/2010 | Okumura | |
| 2010/0178122 A1 | 7/2010 | Bae | |
| 2010/0272526 A1 | 10/2010 | Dufour et al. | |
| 2010/0296884 A1 | 11/2010 | Okumura | |
| 2010/0322732 A1 | 12/2010 | Mergenthaler | |
| 2010/0329804 A1 | 12/2010 | Okumura | |
| 2013/0022422 A1 | 1/2013 | Ramesh | |
| 2013/0022423 A1 | 1/2013 | Ramesh | |
| 2013/0129435 A1 | 5/2013 | Ortlund et al. | |
| 2013/0243537 A1 | 9/2013 | Ogata | |
| 2013/0315684 A1 | 11/2013 | Ramesh | |
| 2014/0133931 A1 | 5/2014 | Bae | |
| 2014/0161552 A1 | 6/2014 | Ramesh | |
| 2014/0212235 A1 | 7/2014 | Prast et al. | |
| 2014/0286719 A1 | 9/2014 | Ramesh | |
| 2016/0023282 A1 | 1/2016 | Ramesh | |
| 2016/0297011 A1 | 10/2016 | Park et al. | |
| 2017/0001248 A1 | 1/2017 | Ramesh | |
| 2018/0029141 A1 | 2/2018 | Ishi | |
| 2018/0111205 A1 | 4/2018 | Ishi | |

FOREIGN PATENT DOCUMENTS

| | | | |
|---|---|---|---|
| JP | 2009178787 A | | 8/2009 |
| JP | 2010099778 A | * | 5/2010 |
| SE | 9203716 | | 6/1994 |
| SE | 9701494 | | 2/1999 |
| SE | 0201588 | | 5/2002 |
| SE | 0201587 | | 11/2003 |
| SE | 0402760 | | 5/2006 |
| SE | 0500234 | | 8/2006 |
| WO | WO2019039724 A1 | | 2/2019 |

OTHER PUBLICATIONS

Jan. 19, 2021 Search report EP App. No. 20189283.3.
Mar. 22, 2022 Office action (3 months) (US Only) U.S. Appl. No. 2020-0391297.
Oct. 3, 2022 Final Rejection U.S. Appl. No. 16/898,811, 8 pages.
Jan. 10, 2023 Notice of Allowance U.S. Appl. No. 16/898,811, 7 pages.

* cited by examiner

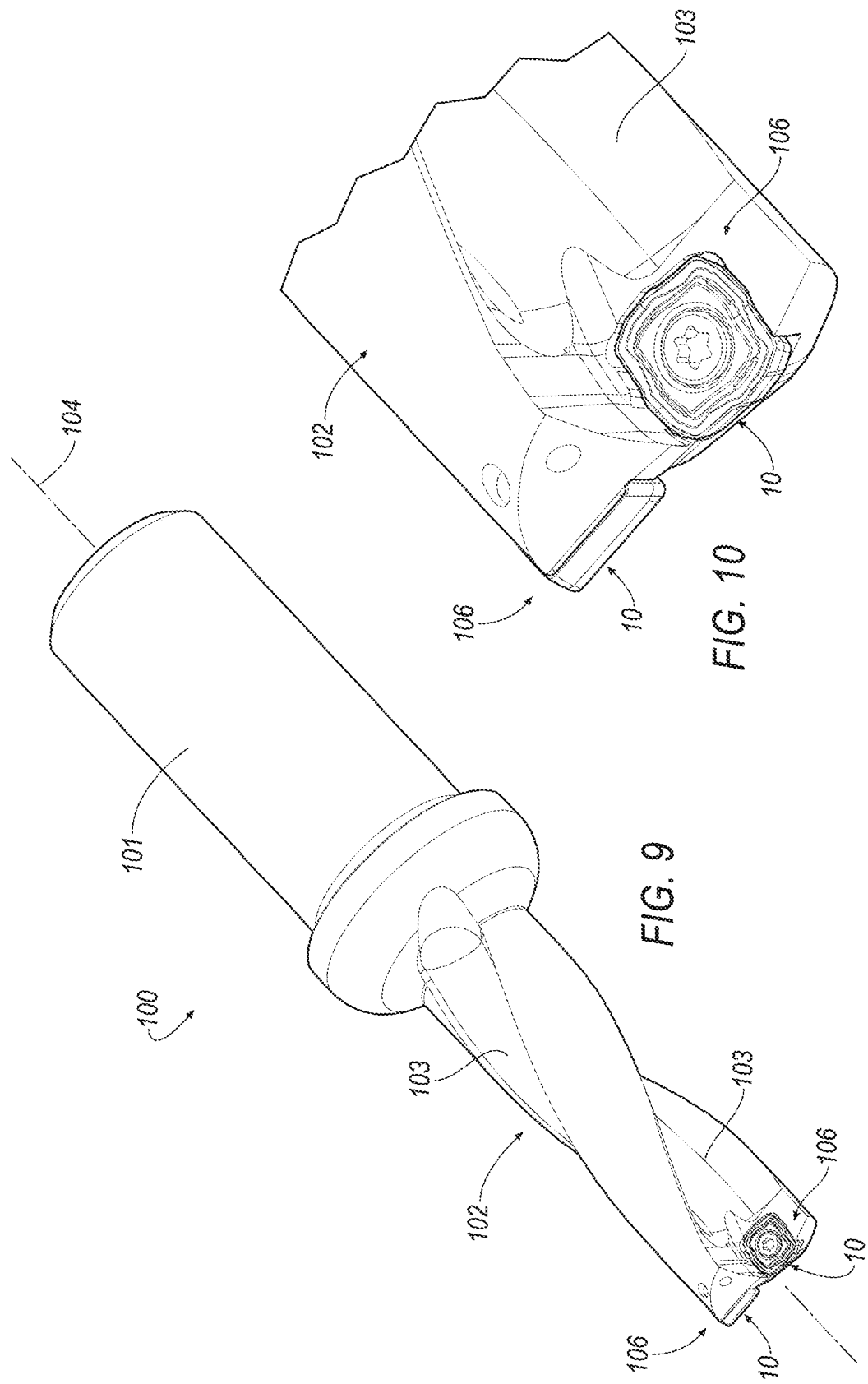

INDEXABLE DRILL INSERT

RELATED APPLICATION DATA

The present application claims priority pursuant to 35 U.S.C. § 119(a) to Indian Patent Application Number 201941032861 filed Aug. 14, 2019, which is incorporated herein by reference in its entirety.

FIELD

The invention relates to a drill insert, and in particular, to a quadrangular indexable drill insert with a segmented backwall for effective chip formation and breaking, and a top surface with a rake surface having a varying, positive rake angle to lower cutting force and strengthen the cutting edge.

BACKGROUND

Drilling tools can be used to drill cylindrical holes in metallic workpieces. The cutting or boring action of the drill tools may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, tool and workpiece can be made to rotate relative to one another. The use of cutting inserts allows for quick changing of the insert upon wear of the cutting surfaces instead of the entire tool and allows for one tool to be used for a variety of different boring applications by simply changing the insert and not the entire drill assembly.

The indexable drill inserts plays a very important role in drilling because all the sides of insert can be used for cutting one after the other. Further, use of inserts reduces the manufacturing lead time, assembling time and cost per component.

The use of quadrangular indexable drill inserts is known in the art. However, the inserts which are in the art comprises four rectangular cutting edges for cutting the workpiece. The use of rectangular cutting edges makes the drill tend to drift away from its center because the cutting forces act all over the drill body and not exactly at the center. The drill drift further creates a narrow wall, which is not feasible in practical applications. Further, conventional indexable drill inserts rub the surface of the drilling hole if the diameter of the drill hole is less than the predetermined value. In addition, the conventional indexable drill insert tends to break at the corner of the insert.

Recently, many techniques have been introduced by various drill insert manufactures to balance the cutting forces in the drill body to prevent a drill from drifting from the center. One such technique is to divide the cutting edge into a plurality of part edges. The part edges are oriented in a predetermined pattern to balance the cutting forces. In the conventional drill inserts the part edges are joined by a transition edge comprising a convex curved surface and a concave curved surface. The chip formation in the conventional cutting inserts is unsmooth because there is a sudden change over from the concave portion to the convex portion, which results in a high stress area. Also, the chips may sometimes split themselves into smaller fragments, which instead of getting into the flute of the drill tool, go around the drill tool, thereby ruining the surface finish of the hole produced.

In view of the foregoing, it is desirable to develop a drill insert to overcome the limitations of the prior art.

SUMMARY

The problem of effective chip formation and breaking is solved by providing a segmented backwall for effective chip breaking at low feed rates as well as high feed rates. In addition, the problem of insert breakage at the corners is solved by providing a varying rake on the surface at the inner corner of the insert.

In one aspect, an indexable drill insert comprises a top surface, a bottom surface, and a plurality of side surfaces adjoining the top surface and the bottom surface. A plurality of cutting edges is formed by an intersection of a respective side surface with the top surface. A protruding portion is formed on the top surface and is disposed about a mounting through hole of the drill insert. A segmented portion is formed on the top surface and extends radially outwardly from the protruding portion.

In another aspect, an indexable drill insert comprises a top surface, a bottom surface, and a plurality of side surfaces adjoining the top surface and the bottom surface. A plurality of cutting edges is formed by an intersection of a respective side surface with the top surface. Each cutting edge comprises a first cutting edge section formed at an angle with respect to a horizontal reference plane of the drill insert; a second cutting edge section connected to the first cutting edge section by a transitional cutting edge section, the second cutting edge section formed at an angle with respect to the horizontal reference plane of the drill insert, wherein the second cutting edge section is tangential to an imaginary inscribed circle of the drill insert; and a third cutting edge section connected to the second cutting edge section by a convex curve, the third cutting edge section formed at an angle with respect to the horizontal reference plane of the drill insert. The top surface of the drill insert includes a land surface adjacent to and extending radially inwardly from the first cutting edge section and a rake surface adjacent to and extending radially inwardly from the land surface. The land surface has a positive land angle. The rake surface has a positive rake angle that varies along the first cutting edge section.

In yet another aspect, a drill tool has a drill body comprising the indexable drill insert as recited in the preceding paragraph mounted in an insert pocket of the drill body.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 9 is a perspective view of a drill tool including the drill insert of FIG. 1 mounted in a pocket of a drill body according to an exemplary embodiment of the invention; and FIG. 10 illustrates a partially-exploded, isometric view of the drill of FIG. 9 with the drill insert of FIG. 1 mounted in the pocket of the drill body.

DETAILED DESCRIPTION

Figure 1:
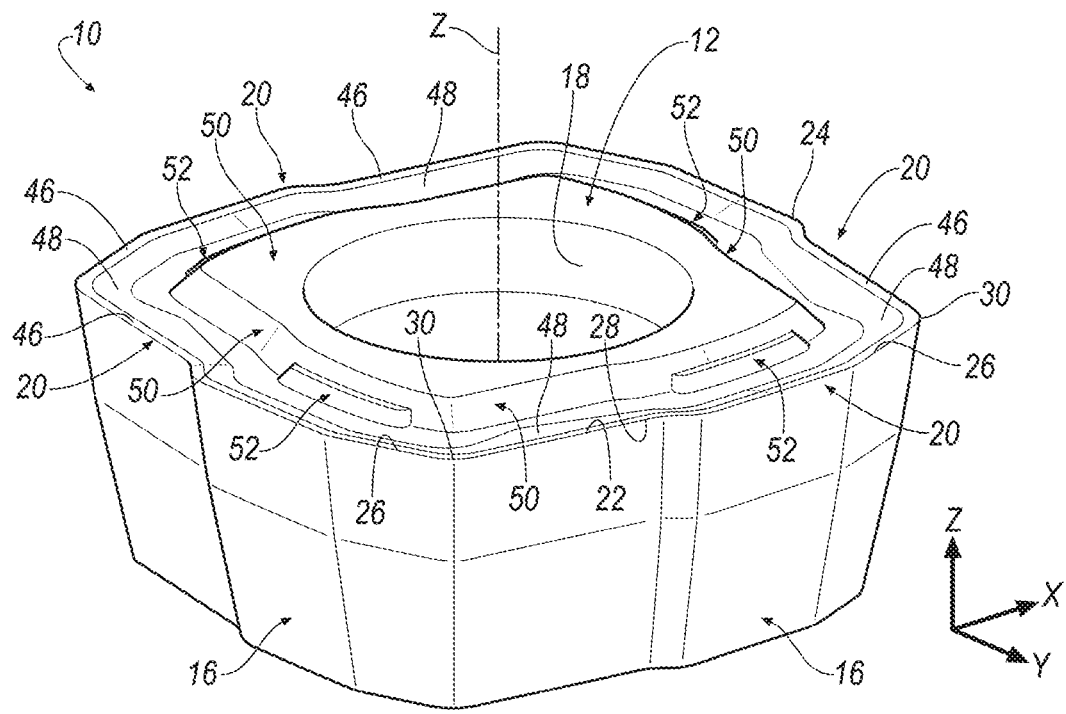
FIG. 1 is a top isometric view of a drill insert in accordance with an embodiment of the present invention.

Below are illustrations and explanations for a version of a cutting tool, such as an orbital drill, and the like, with both right-handed helical or spiral flutes and left-handed helical or spiral flutes for machining a workpiece (not shown) made of multiple materials. However, it is noted that the cutting tool may be configured to suit any specific application, such as reaming, end milling, and the like, and is not limited only to the example in the illustrations.

The description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Rake angle is a parameter used in various cutting and machining processes, describing the angle of the cutting face relative to the work. As used herein, the rake angle is defined as the angle of orientation of the tool's rake surface from a reference plane (nR) and measured on some other plane. The reference plane (nR) is a plane that is perpendicular to the cutting velocity vector at any point on the cutting tool. There are three types of rake angles: positive, negative, and neutral.

As used herein, a tool has a positive rake when the face of the cutting tool slopes away from the cutting edge at inner side.

As used herein, a tool has a negative rake angle when the face of the cutting tool slopes away from the cutting edge at outer side.

As used herein, the land angle is defined as the angle of orientation of the tool's land surface from the reference plane (nR) and measured on some other plane. There are three types of land angles: positive, negative, and neutral.

Figure 2:
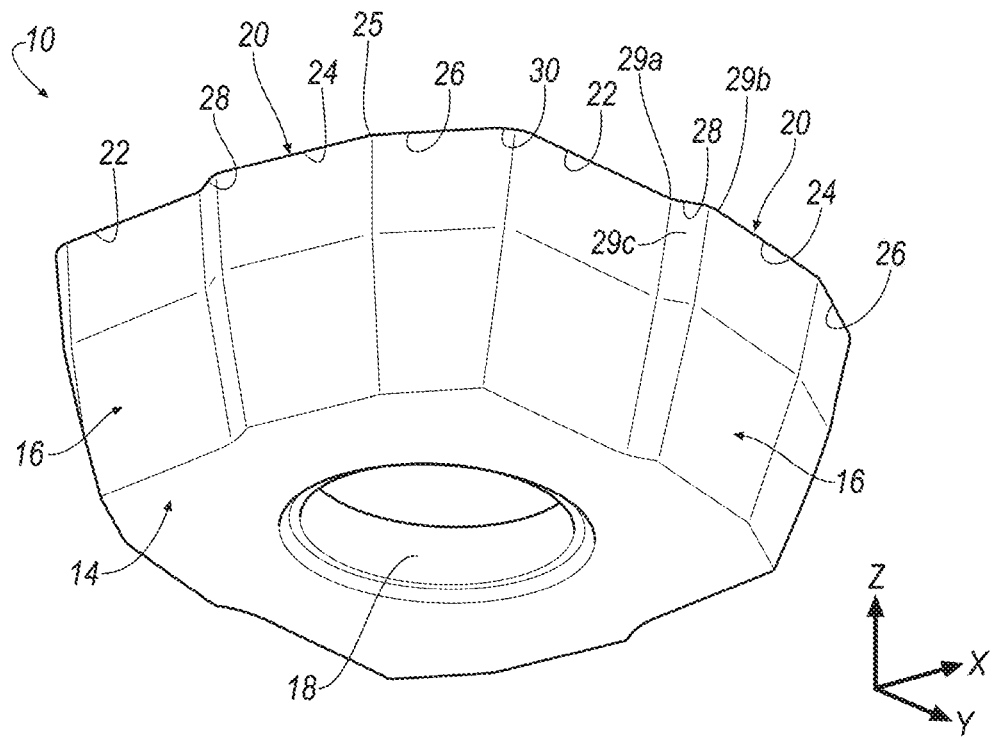
FIG. 2 is a bottom isometric view of the drill insert of FIG. 1.

Referring now to FIGS. 1 and 2, top and bottom isometric views of an indexable drill insert 10 is shown according to an embodiment of the invention. In general, the drill insert 10 comprises a top surface 12, a bottom surface 14 and a side surface 16 adjoining the top and bottom surfaces 12 and 14. In accordance with an embodiment of the invention, the body of the drill insert 10 is structured and arranged so that the side surfaces 16 slope or slant generally inwardly from the top surface 12 to the bottom surface 14 such the bottom surface 14 may have a smaller surface area than the top surface 12 to provide a positive cutting geometry between the drill insert 10 and a pocket 106 in a drill body 102, as shown in FIGS. 9 and 10. The top surface 12 is intersected by the side surface 16 to form a cutting edge 20 on each side of the drill insert 10.

As shown in FIGS. 1 and 2, the indexable drill insert 10 comprises a mounting through hole 18 extending from the top surface 12 to the bottom surface 14. The mounting through hole 18 is concentric with a central, vertical axis, i.e., Z-axis, and is substantially perpendicular to the top surface 12 and the bottom surface 14 of the drill insert 10. The mounting through hole 18 is structured and arranged to receive an insert screw 110 (FIGS. 9 and 10).

In accordance with an embodiment of the invention, each cutting edge 20 may be formed by a plurality of cutting edge segments. As shown in FIGS. 1-4, each cutting edge 20 is formed by a first cutting edge segment 22, a second cutting edge segment 24 and a third cutting edge segment 26. In accordance with an embodiment of the invention, the drill insert 10 is mounted in the drill body 102 having a generally cylindrical body 102 with a central longitudinal rotational axis 104 (FIGS. 9 and 10). In certain embodiments, when the drill insert 10 is mounted in the drill body 102, the first cutting edge segment 22 is located radially closer to the central longitudinal rotational axis 104 than the second cutting edge segment 24 and the third cutting edge segment 26, and the third cutting edge segment 26 is located radially outward from the central longitudinal rotational axis 104 compared to the first cutting edge segment 22 and the second cutting edge segment 24.

In accordance with an embodiment of the invention, each cutting edge 20 may be formed by identical cutting edge segments. In accordance with an embodiment of the invention, the first, second and third cutting edge segments 22, 24 and 26 are substantially linear. In accordance with an embodiment of the invention, the orientation and length of the plurality of cutting edge segments 22, 24 and 26 provide effective centering and penetration into a work piece at entry, stronger corner edge portions, prevent drifting of the drill body 102 from its center and more effectively direct the cutting forces.

Figure 3A:
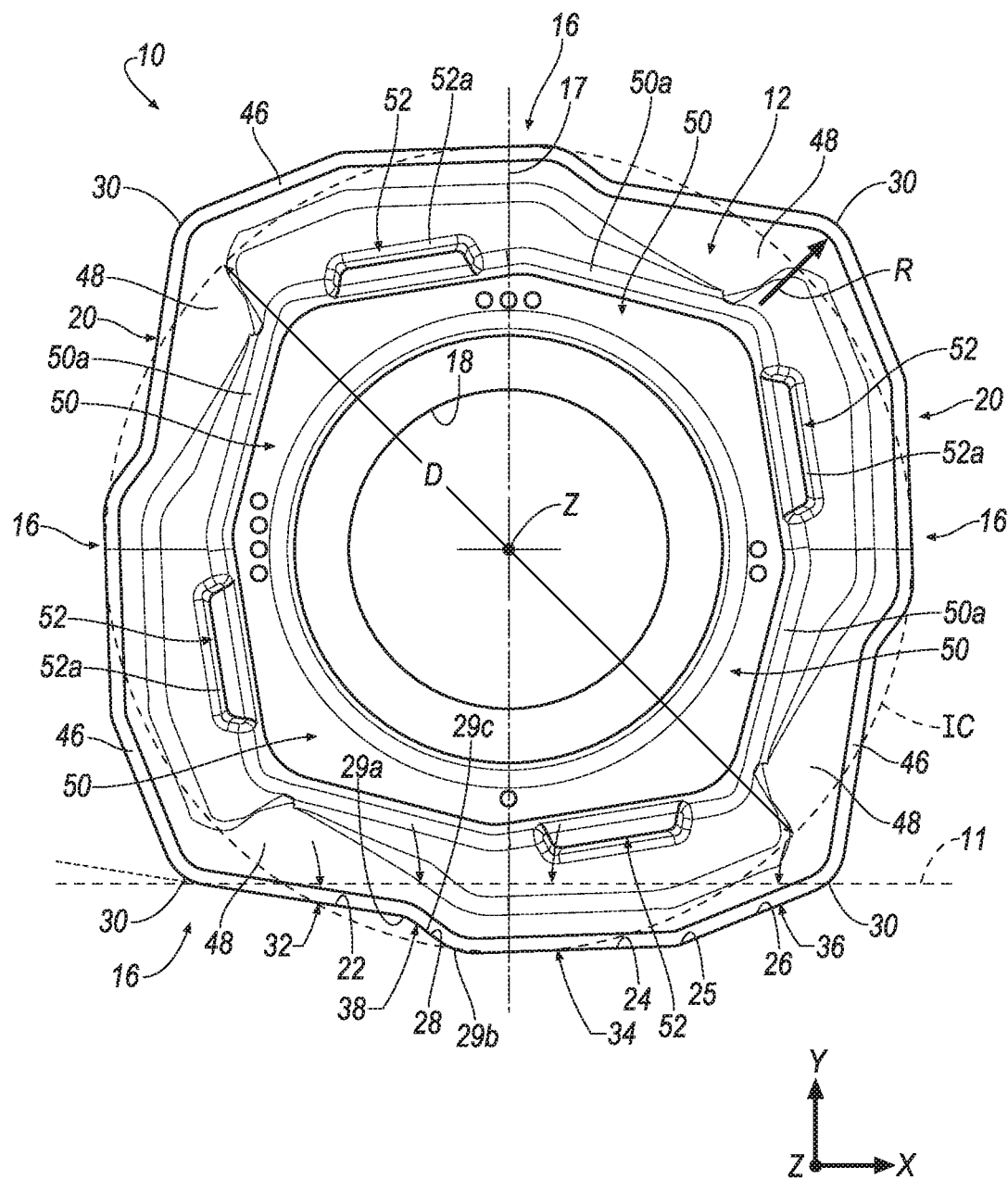
FIGS. 3A and 3B are top views of the drill insert of FIG. 1.
Figure 3B:
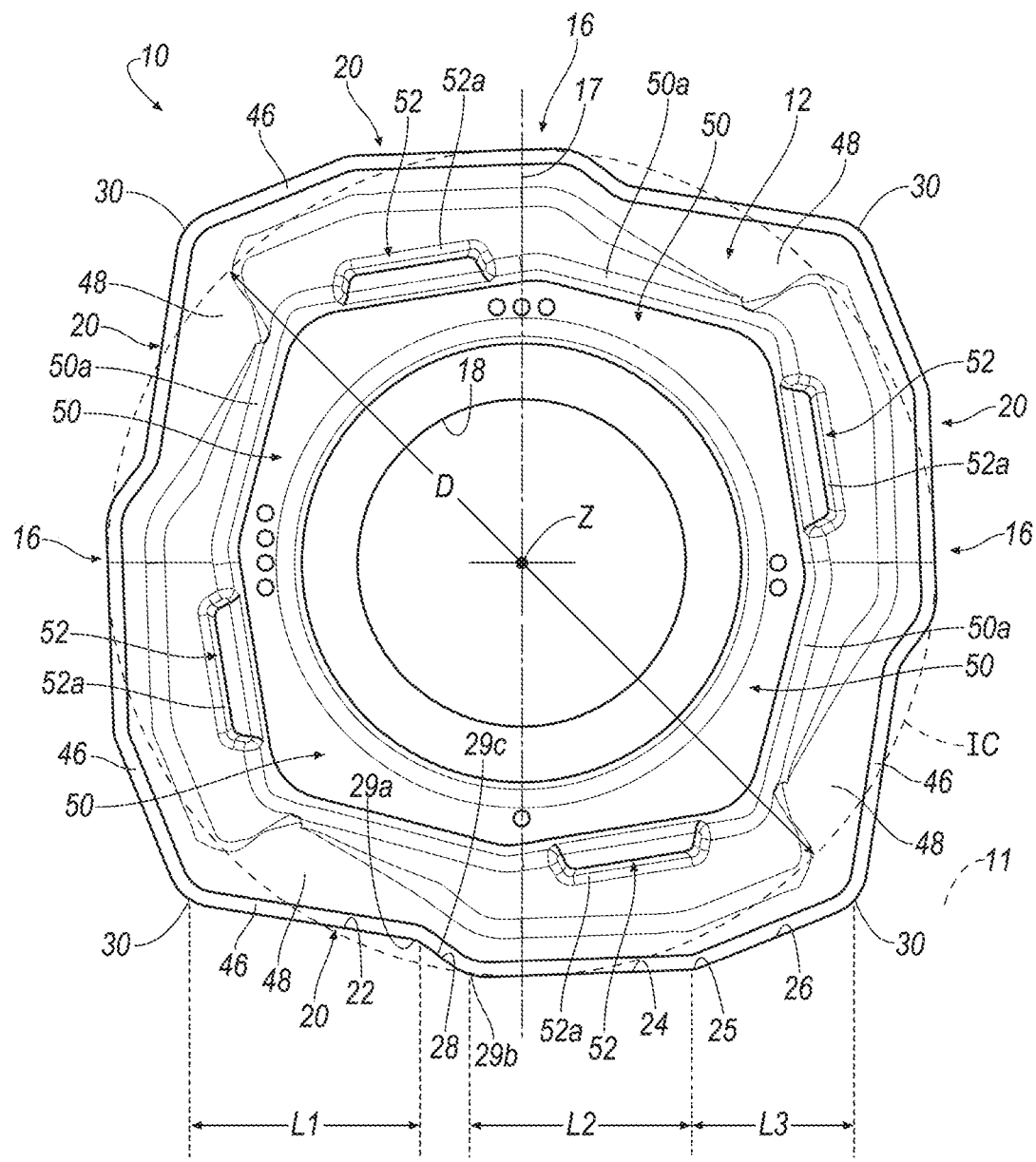

As shown in FIGS. 1, 3A and 3B, each cutting edge 20 of the drill insert 10 comprises a transitional cutting edge segment 28 connecting the first cutting edge segment 22 to the second cutting edge segment 24. In accordance with an embodiment of the invention, the transitional cutting edge segment 28 forms a concave curve 29A with the first cutting edge segment 22 and a convex curve 29B with second cutting edge segment 24. As shown in FIGS. 2 and 3A, the transitional cutting edge segment 28 may include a linear portion 29C between the concave curve 29A formed with the first cutting edge segment 22 and the convex curve 29B formed with the second cutting edge segment 24. Alternatively, the transitional cutting edge segment 28 may be colinear with the first cutting edge segment 22 and form only a convex curve 29B with second cutting edge segment 24. In accordance with an embodiment of the invention, the transition between the second cutting edge segment 24 and the third cutting edge segment 26 may form a convex curve 25. In accordance with an embodiment of the invention, the convex curve 29B formed by the intersection transitional cutting edge segment 28 and the second cutting edge segment 24 may be the first portion of the cutting edge 20 to make contact with a work piece, as further described below.

In accordance with an embodiment of the invention, the indexable drill insert 10 comprises four corner edge portions 30 formed between adjacent cutting edges 20. As shown in FIG. 3A, each corner edge portion 30 is formed as rounded segment having a radius, R, that allows for a connection between adjacent cutting edges 20. For example, the corner edge portion 30 may connect a third cutting edge segment 26 of one cutting edge 20 with a first cutting edge segment 22 of a subsequent cutting edge 20. In certain embodiments, the radius R of the corner edge portions 30 may be determined by the overall height of the insert 10 and the diameter, D, of an imaginary inscribed circle, IC. For example, the radius, R, of each corner edge portion 30 may typically range from about 0.1 millimeters to about 1.6 millimeters. In a particular embodiment, the radius, R, of each corner edge portion 30 may be about 0.4 millimeters.

As shown in FIGS. 3A and 3B, a horizontal reference plane 11 passes through the center of adjacent corner edge portions 30 of the drill insert 10 and a vertical reference plane 17 bisects the mounting through hole 18. As shown in FIG. 3A, the horizontal reference plane 11 is parallel to the longitudinal axis, i.e., the X-axis and perpendicular to the vertical axis, i.e., the Z-axis, of the drill insert 10. In the embodiment shown, the vertical axis, i.e., the Z-axis, may be substantially parallel to the central longitudinal rotational axis 104 of the drill body 102. In accordance with an embodiment of the invention, the orientation of the plurality of cutting edge segments of each cutting edge 20 may be described in relation to the horizontal reference plane 11. As shown in FIG. 3A, the first cutting edge segment 22 extends away from a first corner edge portion 30 adjacent to the central longitudinal rotational axis 104 at a first cutting edge angle 32 with respect to the horizontal reference plane 11, which in the embodiment shown is a positive angle. For example, the first cutting edge angle 32 may be less than about 35 degrees, for example, from about 2 degrees to about 30 degrees, or from about 5 degrees to about 20 degrees, or from about 7 degrees to about 18 degrees. In a particular embodiment, the first cutting edge angle 32 may be about 9 degrees.

As shown in FIG. 3A, the second cutting edge segment 24 extends radially outward in relation to the first cutting edge segment 22 at a second cutting edge angle 34 with respect to the horizontal reference plane 11, which in the embodiment shown is a negative angle rather than the positive first cutting edge angle 32 of the first cutting edge segment 22. In the illustrated embodiment, the second cutting edge segment 24 is tangential to an imaginary inscribed circle (IC) of the drill insert (10). The second cutting edge angle 34 may allow for the convex curve 29B formed by the intersection of the transitional cutting edge segment 28 and the second cutting edge segment 24 to be the first contact point with the work piece and allows for the drill insert 10 to be rigidly secured within a pocket 106 of the drill body 102 (FIGS. 9 and 10). For example, the second cutting edge angle 34 may typically range from about 0.5 degrees to about 10 degrees, or from about 1 degree to about 7 degrees, or from about 1.5 degrees to about 5 degrees. In a particular embodiment, the second cutting edge angle 34 may be about 2 degrees.

In accordance with an embodiment of the invention, the second cutting edge angle 34 allows the convex curve 29B formed by the intersection transitional cutting edge segment 28 and the second cutting edge segment 24 to be forward along the central longitudinal rotational axis 104 compared to the convex curve 25 of the transition between the second cutting edge segment 24 and the third cutting edge segment 26. For example, the convex curve 29B may typically be at least 0.02 millimeter axially forward from the convex curve 25, for example, at least 0.05 millimeter, or at least 0.1 millimeter, or at least 1.25 millimeters axially forward from the convex curve 25. The convex curve 29B may typically range from about 0.02 millimeters to about 3 millimeters axially forward from the convex curve 25, for example, from about 0.075 millimeter to about 2 millimeters axially forward, or from about 0.1 millimeters to about 1.5 millimeters axially forward from the convex curve 25 with respect to the vertical reference plane 17 (i.e., the Z-axis).

As shown in FIG. 3A, the third cutting edge segment 26 extends from a second cutting edge segment 24 at a third cutting edge angle 36 with respect to the horizontal reference plane 11 to a second corner edge portion 30 radially outward from the vertical reference plane 17. In the embodiment shown, the third cutting edge angle 36 is a negative angle and forms a convex curve 25 between the second and third cutting edge segments 24 and 26. The third cutting edge angle 36 is critical because it allows the active cutting lengths of the central drill insert 10 and the peripheral drill insert 100 to be substantially equal over a range of cutting diameters. In addition, the third cutting edge segment 26 is provided at the third cutting edge angle 36 to allow the convex curve 29B formed by the intersection of the transitional cutting edge segment 28 and the second cutting edge segment 24 to be the first contact point with the work piece. For example, the third cutting edge angle 36 may typically range from about 5 degrees to about 75 degrees, or from about 7.5 degrees to about 45 degrees, or from about 10 degrees to about 35 degrees. In a particular embodiment, the third cutting edge angle 36 may be about 22 degrees. In accordance with an embodiment of the invention, a portion of the third cutting edge segment 26 may be farther from the vertical axis, i.e., the Z-axis of the drill insert 10 compared to the first cutting segment 22.

In accordance with an embodiment of the invention, the linear portion 29C of the transitional cutting edge segment 28 extends radially outward from the first cutting edge segment 22 at a fourth transitional cutting edge angle 38 with respect to the horizontal reference plane 11, which in the embodiment shown is a positive angle. The fourth transitional cutting edge angle 38 allows the transitional cutting edge segment 28 to form the outermost portion of the cutting edge 20 and may provide a first contact point with the work piece. For example, the fourth transitional cutting edge angle 38 may typically range from about 5 degrees to about 85 degrees, or from about 10 degrees to about 75 degrees, or from about 15 degrees to about 50 degrees. In a particular embodiment, the fourth transitional cutting edge angle 38 may be about 38 degrees. In accordance with an embodiment of the invention, the fourth transitional cutting edge angle 38 is greater than or equal to the first cutting edge angle 32 of the first cutting edge segment 22. In certain embodiments, the fourth transitional cutting edge angle 38 allows the first cutting edge segment 22 to be closer to the horizontal reference plane 11 than either the second cutting edge segment 24 and/or at least a portion of the third cutting edge segment 26. For example, the first cutting segment 22 may be closer to the vertical axis, i.e., the Z-axis, of the drill insert 10 compared to the second cutting edge segment 24 and a portion of the third cutting edge segment 26.

As shown in FIG. 3B, the first cutting edge segment 22 has a length, $L_1$, the second cutting edge segment 24 has a length, $L_2$, and the third cutting edge segment 26 has a length, $L_3$. The lengths of the plurality of cutting edge segments are selected to provide the desired direction of cutting forces and allow for the rigid clamping of the drill insert 10 in a pocket. In accordance with an embodiment of the invention, the length, $L_1$, of the first cutting edge segment 22 may typically range from about 10 percent to about 40 percent of the diameter, D, or from about 20 percent to about 35 percent of the diameter, D, or from about 25 percent to about 30 percent of the diameter, D. The length, $L_2$, of the second cutting edge segment 24 may typically range from about 10 percent to about 40 percent of the diameter, D, or from about 20 percent to about 35 percent of the diameter, D, or from about 25 percent to about 30 percent of the diameter, D. The length, $L_3$, of the third cutting edge segment 24 may typically range from about 10 percent to about 40 percent of the diameter, D, or from about 20 percent to about 35 percent of the diameter, D, or from about 25 percent to about 30 percent of the diameter, D.

In certain embodiments, the first cutting edge segment length, $L_1$, is selected to allow the convex curve 29B formed by the intersection transitional cutting edge segment 28 and the second cutting edge segment 24 to be located at or between the first corner edge portion 30 radially inward from the central longitudinal rotational axis 104 and the vertical reference plane 17. However, as understood by those skilled in the art, the convex curve 29B formed by the intersection of transitional cutting edge segment 28 and the second cutting edge segment 24 may be formed on either side of the vertical reference plane 17. For example, the convex curve 29B may be formed between the vertical reference plane 17 and a second corner edge portion 30. In accordance with an embodiment of the invention, the first cutting edge segment length, $L_1$, may be greater than either the second cutting edge segment length, $L_2$, or the third cutting edge segment length, $L_3$. In certain embodiments, second cutting edge segment length, $L_2$, is less than the first cutting edge segment length, $L_1$, and is greater than the third cutting edge segment length, $L_3$. In certain embodiments, the third cutting edge segment length, $L_3$, is less than the first cutting edge length, $L_1$, and the second cutting edge segment length, $L_2$. The third cutting edge segment length, $L_3$, is selected to correspond to the overall cutting diameter of the drill body 102 to allow the drill insert 10 to have substantially equal active cutting edges. In accordance with an embodiment of the invention, the cutting diameter, $D_C$, is provided by a cutting edge 20 of the central drill insert 10.

In accordance with an embodiment of the invention, the third cutting edge segment 24 length, $L_3$, may be equal to $L_C*[(D_{CL}-D_{CS})]$. In certain embodiments, $L_C$ is a constant ranging from 0.25 to 0.85, $D_{CL}$ corresponds to the largest cutting diameter that the drill inserts 10 will be used with, and $D_{CS}$ corresponds to the smallest cutting diameter that the drill inserts 10 will be used with. In accordance with an embodiment of the invention, $L_C$ is a constant determined based upon the smallest cutting diameter, $D_{CS}$, the largest cutting diameter, $D_{CL}$, the third cutting edge angle 36 of the third cutting edge segment 26 and the radius, R, of the corner edge portion 30. In a particular embodiment, the largest cutting diameter, $D_{CL}$, may be about 19 millimeters and the smallest cutting diameter, $D_{CS}$, may be about 16.5 millimeters. In accordance with an embodiment of the invention, the third cutting edge segment 26 length, $L_3$, being a function of $L_C*[(D_{CL}-D_{CS})]$ allows the drill inserts 10 to perform a substantially equal amount of cutting.

In accordance with an embodiment of the invention, the lengths of the cutting edge segments 22, 24 and 26 and the transitional cutting edge segment 28 may be varied depending on the overall size of the drill insert 10. For example, if the diameter, D, of an imaginary inscribed circle, IC, as shown in FIG. 3B, is increased, the lengths of one or more of the cutting edge segments 22, 24 and 26 and the transitional cutting edge segment 28 may increase. Alternatively, if the diameter, D, of the imaginary inscribed circle, IC, as shown in FIG. 3B, is decreased, the lengths of one or more of the cutting edge segments 22, 24 and 26 and the transitional cutting edge segment 28 may decrease.

Figure 4:
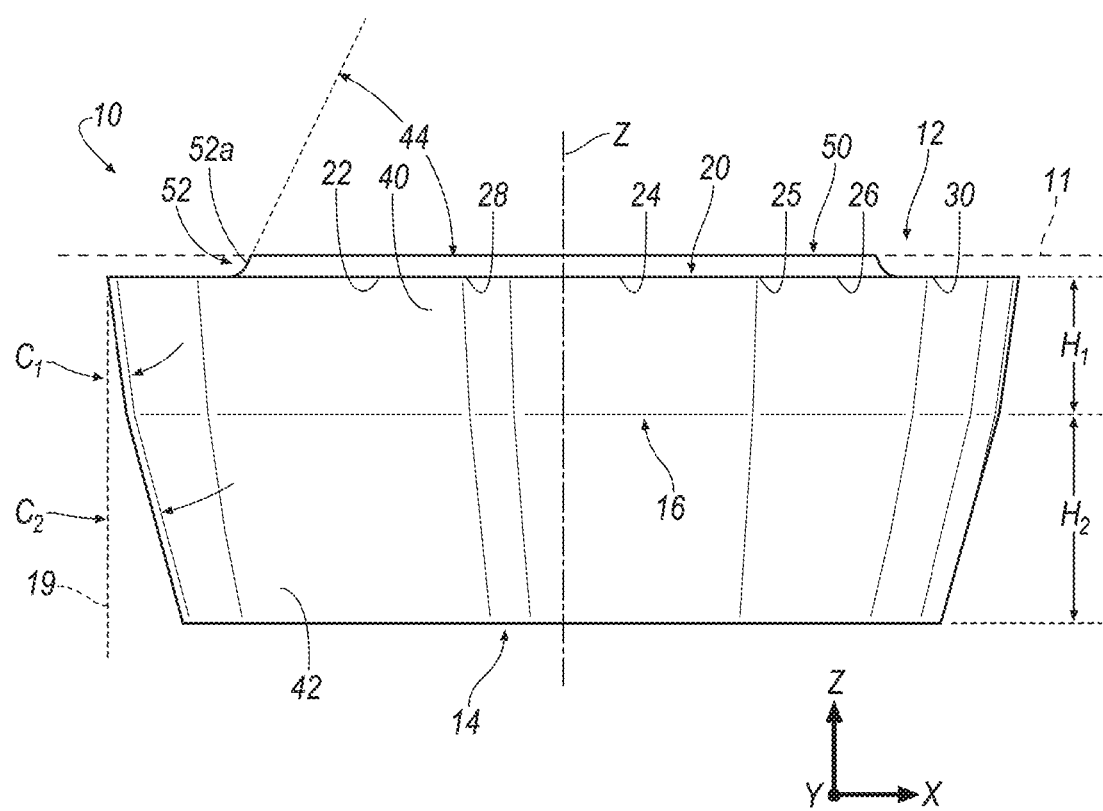
FIG. 4 is a side view of the drill insert of FIG. 1.

As shown in FIG. 4, each side surface 16 comprises a first clearance face 40 extending from the top surface 12 and a second clearance face 42 extending from the first clearance face 40 to the bottom surface 14. As shown in FIG. 4, the first clearance face 40 extends toward the bottom surface 14 from the top surface 12 at a first clearance angle, $C_1$, with respect to the vertical axis, i.e., Z-axis, of the drill insert 10. For example, the first clearance angle, $C_1$, may be at least 1 degree, for example from 1 to 30 degrees, or from about 2.5 degrees to about 20 degrees, or from about 5 degrees to about 15 degrees. In a particular embodiment, the first clearance angle, $C_1$, may be about 8 degrees. The first clearance angle, $C_1$, may prevent rubbing of the first clearance face 40 against machined surfaces by providing clearance between the drill insert 10 and the machined surface of the work piece.

As shown in FIG. 4, the second clearance face 42 extends toward the bottom surface 14 from the first clearance face 40 at a second clearance angle, $C_2$, with respect to the vertical reference plane 19, i.e., Z-axis, of the drill insert 10. For example, the second clearance angle, $C_2$, may be at least 1 degree, for example from about 5 degrees to about 40 degrees, or from about 7.5 degrees to about 30 degrees, or from about 10 degrees to about 20 degrees. In a particular embodiment, the second clearance angle, $C_2$, may be about 15 degrees. The second clearance angle, $C_2$, allows the drill insert 10 to be easily inserted and removed from the pocket 106 of the drill body 102. In accordance with an embodiment of the invention, the first clearance angle, $C_1$, and the second clearance angle, $C_2$, allow for the top surface 12 to be larger than the bottom surface 14. The first clearance angle, $C_1$, and the second clearance angle, $C_2$, further provide the first and second clearance faces 40 and 42 at orientations that allow for the drill insert to be rigidly secured in the pocket 106 of the drill body 102. In the embodiment shown, the second clearance angle, $C_2$, is greater than the first clearance angle, $C_1$, however any other suitable arrangement may be used, e.g., the second clearance angle, $C_2$, may be less than or equal to the first clearance angle, $C_1$.

As shown in FIG. 4, the first clearance face 40 has a height, $H_1$, and the second clearance face 42 has height, $H_2$. In accordance with an embodiment of the invention, the second clearance face height, $H_2$, may be greater than or equal to the first clearance face height, $H_1$, e.g., up to 75 percent higher. In one example, the second clearance face height, $H_2$, may be at least 25 percent, or at least 35 percent, or at least 50 percent greater than the first clearance face height, $H_1$. In certain embodiments, the second clearance face height, $H_2$, is at least 50 percent of a total height of the drill insert 10, e.g., at least 60 percent of the total height of the drill insert. The first clearance face height, $H_1$, and the second clearance face height, $H_2$, are selected to allow the drill insert 10 to be rigidly secured within a pocket 106 of the drill body 102. The ratio of height, $H_1$, of the first clearance face 40 to the height, $H_2$, of the second clearance face 42 may typically range from 1:1 to 1:10, for example, from 1:1.2 to 1:5 or from 1.5:2 to 1:3. In accordance with an embodiment of the invention, the first clearance face 40 may provide an abutment surface to be engaged in the pocket 106, and the second clearance face 42 provides a clearance to prevent the drill insert from contacting the machined surface of the work piece.

The drill insert 10 may be made of any suitable material, such as tool steels, cemented carbides, and super hard material, such as cubic boron nitride (CBN), polycrystalline cubic boron nitride (PCBN), polycrystalline diamonds (PCD), tungsten carbide (WC), cermet, ceramic, and the like. The drill inserts 10 of the invention may be fabricated by any suitable technique, such as carbide powder pressing, grinding or additive manufacturing to provide the plurality of cutting edge segments.

Figure 5:
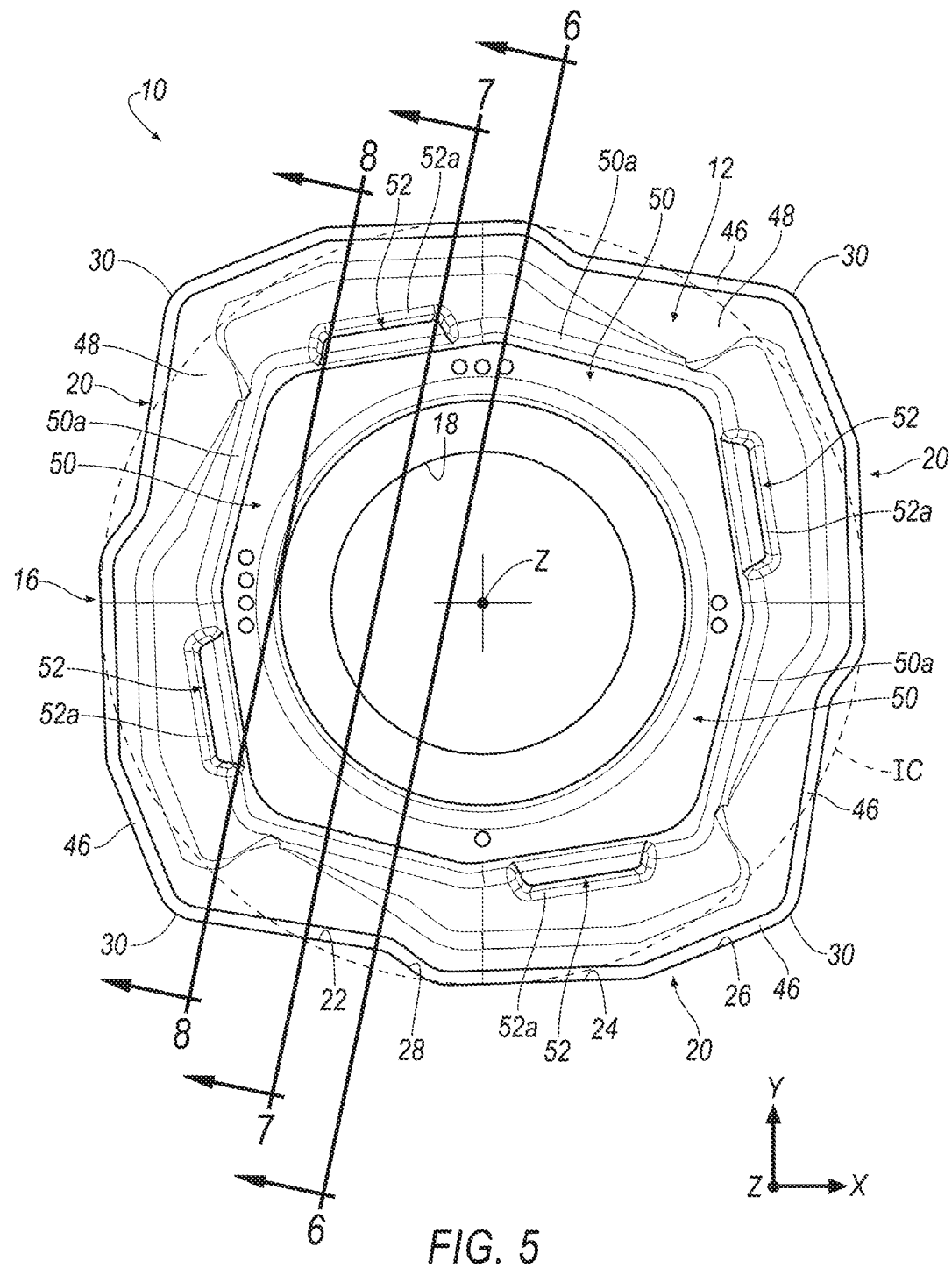
FIG. 5 is another top view of the drill insert of FIG. 1.
Figure 6A:
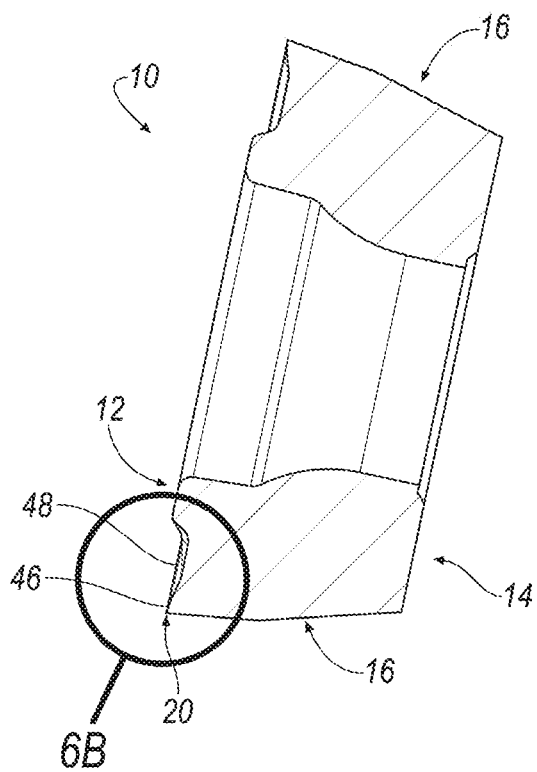
FIG. 6A is a cross-sectional view of the drill insert taken along line 6-6 of FIG. 5.
Figure 6B:
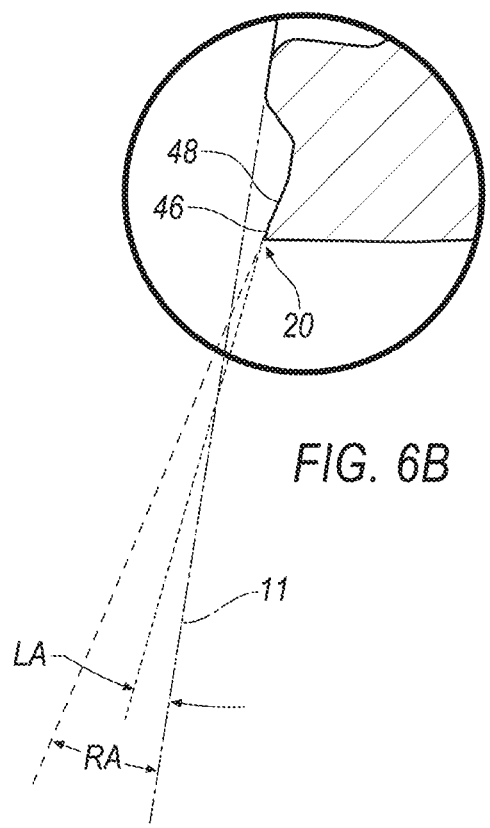
FIG. 6B is an enlarged cross-sectional view of the circled area of the drill insert of FIG. 6A.
Figure 7A:
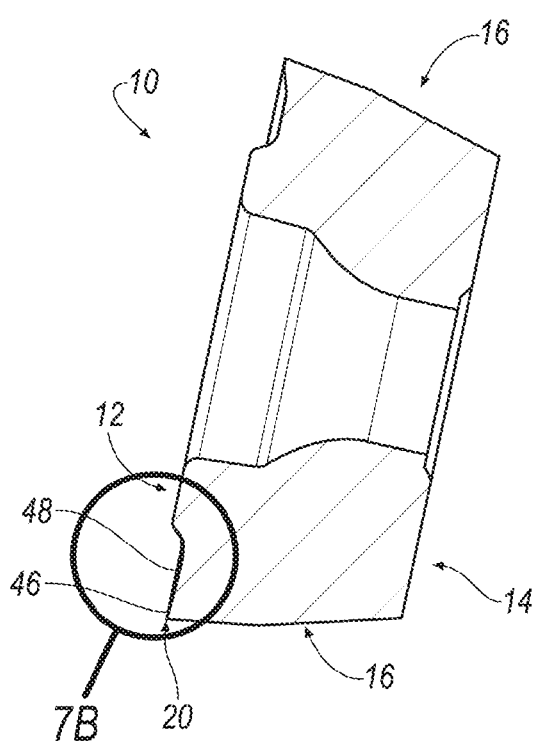
FIG. 7A is a cross-sectional view of the drill insert taken along line 7-7 of FIG. 5.

FIG. 5 shows a top view of the drill insert 10 and FIGS. 6-8 are cross-sectional views of the drill insert 10 taken at different locations along the first cutting edge section 22 of the drill insert 10. As shown in FIG. 5, the top surface 12 of the drill insert 10 includes a land surface 46 adjacent to and extending radially inwardly from the first cutting edge section 22 and a rake surface adjacent to and extending radially inwardly from the land surface 46. The land surface 46 may have a constant width about the perimeter of the drill insert 10. For example, the land surface 46 can have a width in a range between about 0.05 millimeters to about 0.20 millimeters. In one embodiment, the land surface 46 has a width of about 0.12 millimeters. The land surface 46 has a positive land angle.

Figure 7B:
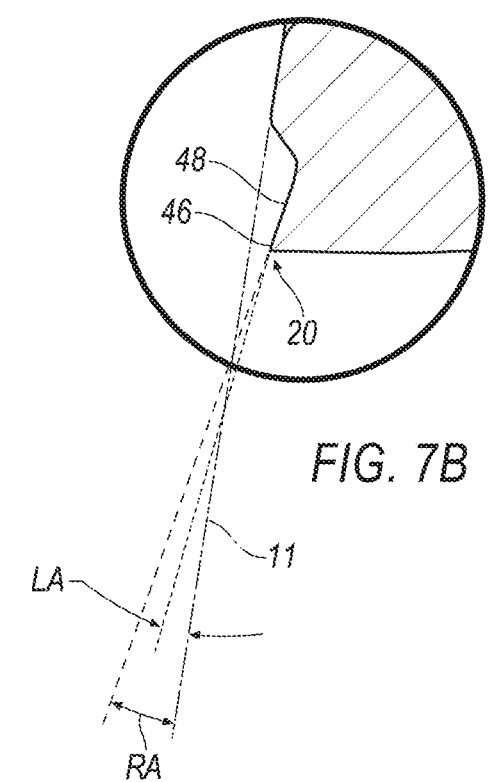
FIG. 7B is an enlarged cross-sectional view of the circled area of the drill insert of FIG. 7A.
Figures 8A, 8B:
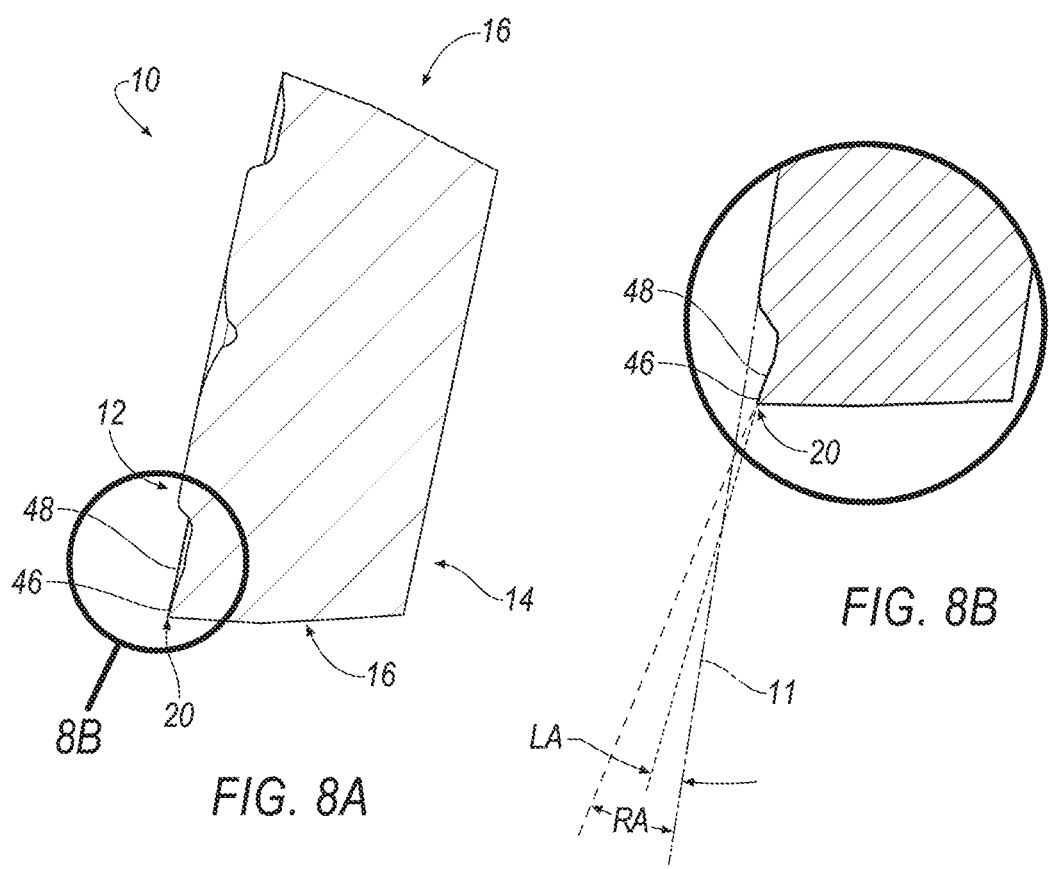
FIG. 8A is a cross-sectional view of the drill insert taken along line 8-8 of FIG. 5.
FIG. 8B is an enlarged cross-sectional view of the circled area of the drill insert of FIG. 8A.

In one aspect of the invention, the rake surface 48 has a positive rake angle, RA, that varies along the first cutting edge section 22 to lower the cutting force during operation of the drill insert 10. In one embodiment, the positive rake angle, RA, is largest proximate the transitional cutting edge section 28 and is smallest approximately midway between the corner 30 and the second cutting edge section 24. The angle, RA, of the rake surface 48 depends on type of material to be machined, and the angle, RA, is generally in the range of from about 0.1 degrees to about 20.0 degrees with respect to horizontal reference plane 11 that is substantially parallel to horizontal axis (i.e., X-axis). In one example, the rake angle, RA, varies from about 14 degrees proximate the transitional cutting edge segment 28 (and also the concave curve 29A), as shown in FIG. 6B, then decreases to about 10 degrees approximately midway between the corner 30 and the transitional cutting edge section 28, as shown in FIG. 7B, and then increases to about 13 degrees proximate the corner 30 of the drill insert 10, as shown in FIG. 8B.

By contrast, the land surface 46 has a constant land angle, LA, with respect to the horizontal reference plane 11, as shown in FIGS. 6-8. In one embodiment, the land angle, LA, can have a magnitude in a range between about 0 degrees and about 15 degrees. For example, the land angle, LA, can have a magnitude about 7 degrees. It is noted that the rake angle, RA, is always larger in magnitude than the land angle, LA, at any location along the first cutting edge section 22.

Referring back to FIGS. 1-5, in another aspect of the invention, a protruding portion 50 with a backwall 50a is formed on the top surface 12 of the drill insert 10. The protruding portion 50 is disposed about the mounting through hole 18 of the drill insert 10. The top surface 12 also is provided with a stepped or segmented portion 52 extending radially outward with respect to the protruding portion 50 that facilitates cutting/fragmenting of the chip resulting from the drilling operation, and directs the chip to the helical flutes 103 of the drill body 102 for effective chip evacuation at both low and high feed rates (FIGS. 9 and 10). In the illustrated embodiment, the segmented portion 52 is located radially inward from the second cutting edge section 24 and the third cutting edge section 26. However, it will be appreciated that the invention is not limited by the location of the segmented portion 52, and that the invention can be practiced with the segmented portion 52 located at any desirable location for effective chip control. The backwall 50a may be linear (FIG. 3B) or curvilinear (FIG. 1).

As shown in FIG. 4, a front wall 52a of the segmented portion 52 is inclined at an angle 44 with respect to the horizontal reference plane 11 that is substantially parallel to the horizontal axis (i.e., X-axis) of the drill insert 10. The angle 44 is generally in the range between about 30 degrees to about 60 degrees with respect to the horizontal reference plane 11. In one embodiment, the angle 44 of the front wall 52a is about 45 degrees with respect to the horizontal reference plane 11. The front wall 52a may be linear (FIG. 3B) or curvilinear (FIG. 1). In one embodiment, the backwall 50a and the front wall 52a may be coplanar.

Referring now to FIGS. 9 and 10, an exemplary embodiment of a drill tool 100 with the drill insert 10 of the invention mounted thereon is shown according to an exemplary embodiment of the invention. The drill tool 100 includes a shank 101 of predetermined length and a drill body 102 having a cylindrical basic shape. The drill body 102 includes a pair of insert pockets 106 that are opposite sides of a rotational axis 104 of the drill tool 100. The drill body 102 also includes one or more helical flutes 103 on its outer surface for evacuating the chips generated during the drilling operation.

As shown in FIG. 10, the shape of the peripheral pocket 106 matches with the shape of the drill insert 10 so that the drill insert 10 can be properly mounted in the pocket 106. Further, the peripheral pocket 106 includes a threaded hole (not shown) for fastening the drill insert 10 with the drill body 102 using an insert screw 110. As clearly understood, the insert screw 110 passes through the mounting through hole 18 of the drill insert 10 and fastens the drill insert 10 to the insert pocket 106.

During a drilling operation, the cutting edge sections 22, 24, 26 with concave curve 29A and convex curve 29B of the drill insert 10 direct the cutting forces to the center of the drill body 102 or toward the rotational axis 104, which prevents unwanted movement of the drill 100 from its rotational axis 104. The corners 30 of the cutting edges 20 enlarge the hole (not shown) that is produced by the drill insert 10 mounted in the outer, peripheral pocket 106 of the drill body 102. The chips generated during the drilling operation are cut/fragmented by the protruding portion 50, the backwall 51 and the segmented portion 52 and are directed to the one or more helical flutes 103 of the drill body 102 for effective chip evacuation at both low and high feed rates.

As described above, the invention provides a quadrangular indexable drill insert in which all four cutting edges are separately used for drilling, i.e. when one edge wears out the subsequent edge can be used for cutting.

As described above, the invention provides a quadrangular indexable drill insert which has four identical cutting edges 18 which are divided into a plurality of cutting edge sections 22, 24, 26 to direct the forces toward the rotational axis 104 of the drill 100, which eliminates unwanted movement of the drill 10 from its center during a drilling operation.

As described above, the invention provides a quadrangular indexable drill insert which has a protruding portion with a segmented portion on its top surface to break the chip generated during the drilling process.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The patents and publications referred to herein are hereby incorporated by reference.

Having described presently preferred embodiments the invention may be otherwise embodied within the scope of the appended claims.

The invention claimed is:

1. An indexable drill insert, comprising:
a top surface, a bottom surface, and a plurality of side surfaces adjoining the top surface and the bottom surface;

a plurality of cutting edges formed by an intersection of a respective side surface with the top surface;

a protruding portion formed on the top surface and disposed about a mounting through hole of the drill insert; and a segmented portion formed on the top surface and extending radially outwardly from the protruding portion, wherein each cutting edge comprises:

a first cutting edge section extending away from a first corner edge portion, wherein the first cutting edge section is formed with a first cutting edge angle with respect to a horizontal reference plane of the drill insert such that the first cutting edge section extends radially outward from the first corner edge portion;

a second cutting edge section connected to and extending radially outward from the first cutting edge section by a transitional cutting edge section, wherein the second cutting edge section is formed at a second cutting edge angle with respect to the horizontal reference plane of the drill insert, and wherein the second cutting edge section is tangential to an imaginary inscribed circle (IC) of the drill insert; and a third cutting edge section connected to the second cutting edge section by a convex curve and extending toward a second corner edge portion, wherein the third cutting edge section is formed at a third cutting edge angle with respect to the horizontal reference plane of the drill insert.

2. The indexable drill insert of claim 1, wherein the segmented portion includes a front wall inclined at an angle in a range between 30 degrees and 60 degrees with respect to a horizontal reference plane that is substantially parallel to a horizontal axis (X) of the drill insert.

3. The indexable drill insert of claim 1, wherein the top surface of the drill insert includes a land surface adjacent to and extending radially inwardly from the first cutting edge section and a rake surface adjacent to and extending radially inwardly from the land surface, wherein the rake surface has a positive rake angle (RA) that varies along the first cutting edge section.

4. The indexable drill insert of claim 1, wherein the first cutting edge section is linear, and wherein the first cutting edge angle is in a range between about 2 degrees to about 30 degrees with respect to the horizontal reference plane.

5. The indexable drill insert of claim 1, wherein the second cutting edge section is linear, and wherein the second cutting edge angle is in a range from about 0.5 degrees to about 10 degrees with respect to the horizontal reference plane.

6. The indexable drill insert of claim 1, wherein the third cutting edge section is linear, and wherein the third cutting edge angle is in a range between about 5 degrees to about 75 degrees with respect to the horizontal reference plane.

7. The indexable drill insert of claim 1, wherein the segmented portion is located radially inward from the second cutting edge section and the third cutting edge section.

8. The indexable drill insert of claim 1, wherein each corner edge portion is formed having a predetermined radius (R) and adjoins the first cutting edge section of one cutting edge with the third cutting edge section of an adjacent cutting edge.

9. The indexable drill insert of claim 8, wherein the radius (R) is in a range between about 0.1 millimeters to about 1.6 millimeters.

10. The indexable drill insert of claim 1, wherein the mounting through hole extends from the top surface to the bottom surface of the drill insert.

11. The indexable drill insert of claim 1, wherein each cutting edge is identical.

12. A drill tool having a drill body comprising the indexable drill insert as recited in claim 1 mounted in an insert pocket of the drill body.

13. The drill tool of claim 12, wherein the tool body includes one or more helical flutes for evacuating chips generated during a drilling operation.

14. An indexable drill insert, comprising:

a top surface, a bottom surface, and a plurality of side surfaces adjoining the top surface and the bottom surface;

a plurality of cutting edges formed by an intersection of a respective side surface with the top surface, wherein each cutting edge comprises:

a first cutting edge section extending away from a first corner edge portion, wherein the first cutting edge section is formed at an angle with respect to a horizontal reference plane of the drill insert such that the first cutting edge section extends radially outward from the first corner edge portion;

a second cutting edge section connected to and extending radially outward from the first cutting edge section by a transitional cutting edge section, wherein the second cutting edge section is formed at an angle with respect to the horizontal reference plane, wherein the second cutting edge section is tangential to an imaginary inscribed circle (IC) of the drill insert; and a third cutting edge section connected to the second cutting edge section by a convex curve and extending toward a second corner edge portion, wherein the third cutting edge section is formed at an angle such that the third cutting edge section extends radially inward with respect to the horizontal reference plane of the drill insert, wherein the top surface of the drill insert includes a land surface adjacent to and extending radially inwardly from the first cutting edge section and a rake surface adjacent to and extending radially inwardly from the land surface, and wherein the rake surface has a positive rake angle (RA) that varies along the first cutting edge section.

15. The indexable drill insert of claim 14, further comprising a protruding portion formed on the top surface.

16. The indexable drill insert of claim 15, further comprising a segmented portion formed on the top surface and extending radially outwardly from the protruding portion, the segmented portion including a front wall inclined at an angle in a range between 30 degrees and 60 degrees with respect to the horizontal reference plane.

17. The indexable drill insert of claim 16, wherein the segmented portion is located radially inward from the second cutting edge section (24) and the third cutting edge section.

18. The indexable drill insert of claim 14, wherein each corner edge portion is formed having a predetermined radius (R) and adjoins the first cutting edge section of one cutting edge with the third cutting edge section of an adjacent cutting edge.

19. The indexable drill insert of claim 18, wherein the radius (R) is in a range between about 0.1 millimeters to about 1.6 millimeters.

* * * * *